United States Patent [19]
Parker

[11] 3,965,742
[45] *June 29, 1976

[54] DIGITAL THERMOMETER AND METHOD OF MANUFACTURE

[75] Inventor: Robert Parker, Danville, Calif.

[73] Assignee: RPR, Inc., Dublin, Calif.

[ * ] Notice: The portion of the term of this patent subsequent to Jan. 21, 1992, has been disclaimed.

[22] Filed: Oct. 24, 1974

[21] Appl. No.: 517,718

Related U.S. Application Data

[60] Division of Ser. No. 351,220, April 16, 1973, Pat. No. 3,861,213, which is a continuation-in-part of Ser. No. 263,064, June 15, 1972, abandoned.

[52] U.S. Cl. ............................ 73/356; 350/160 LC
[51] Int. Cl.² ...................................... G01K 11/16
[58] Field of Search ................ 73/356; 23/230 LC; 350/160 LC; 116/114.5

[56] References Cited
UNITED STATES PATENTS

| | | | |
|---|---|---|---|
| 1,676,536 | 7/1928 | Ferkel | 73/356 |
| 3,440,882 | 4/1969 | Jones | 73/356 |
| 3,661,142 | 5/1972 | Flam | 73/356 |
| 3,861,213 | 1/1975 | Parker | 73/356 |

FOREIGN PATENTS OR APPLICATIONS

| | | | |
|---|---|---|---|
| 1,138,590 | 1/1969 | United Kingdom | 23/230 LC |

*Primary Examiner*—S. Clement Swisher
*Assistant Examiner*—Denis E. Corr
*Attorney, Agent, or Firm*—Townsend and Townsend

[57] ABSTRACT

A non-breakable digital thermometer and a method for its manufacture are provided. The thermometer comprises a plastic strip, either flexible or rigid, of microencapsulated temperature responsive liquid crystal material in a lateral array of numerical indicia, each index having associated with it liquid crystals having a temperature responsive range relevant to the numerical value of the index. Overlap of temperature responsive ranges is provided to insure at least one visible indicia, when the temperature being measured is within the range of interest.

A substantially continuous sheet of an inert transparent base is sequentially printed with a darkly pigmented mask defining transparent indicia areas. Different liquid crystal composition slurries are coated in a continuous stripe over the appropriate indicia, with adjacent compositions allowed to mix at the edges, before rapid partial drying prevents additional mixing. The compositions are then dried substantially completely, and coated with a darkly pigmented coating. Individual strips are then cut transverse to the direction of movement of the film so as to provide individual digital thermometers.

13 Claims, 11 Drawing Figures

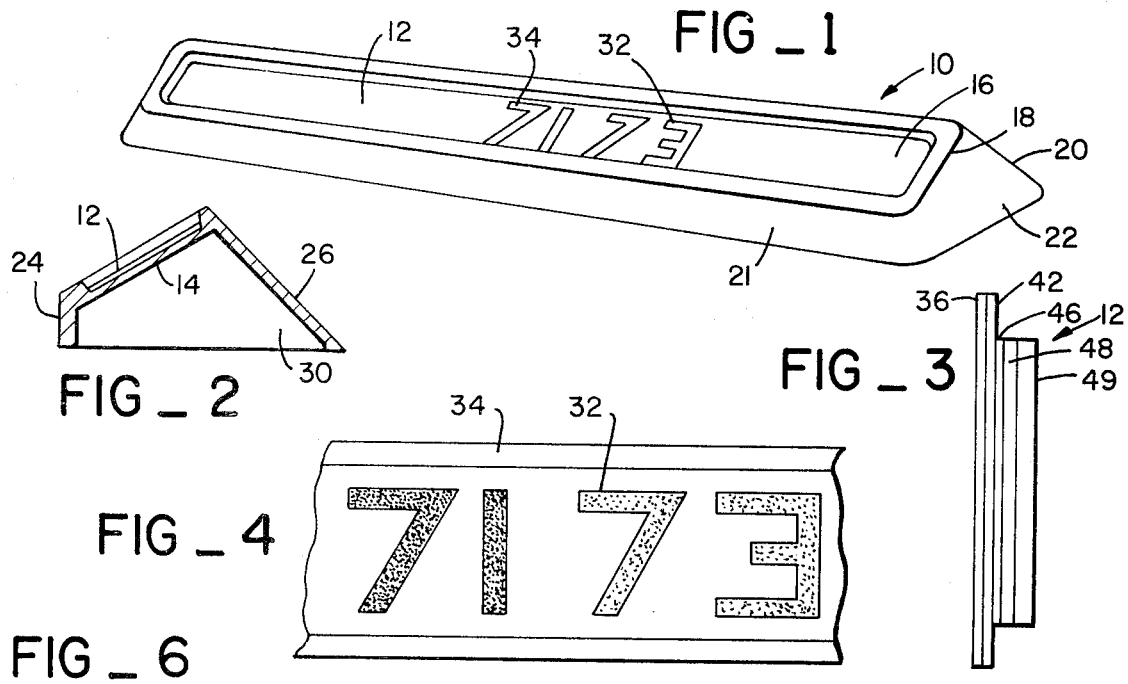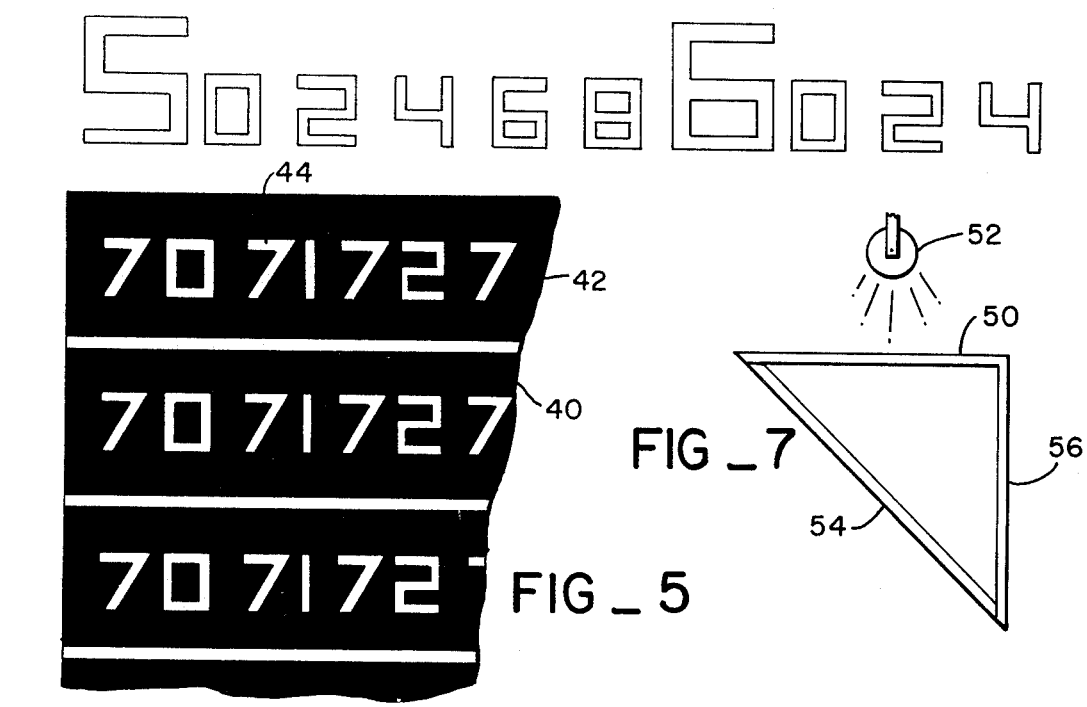

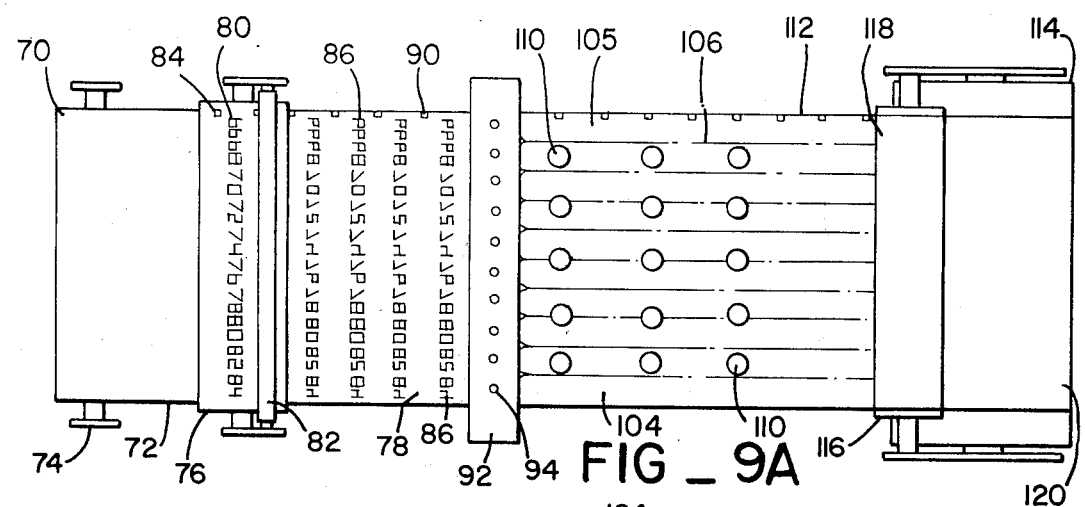
FIG_9A
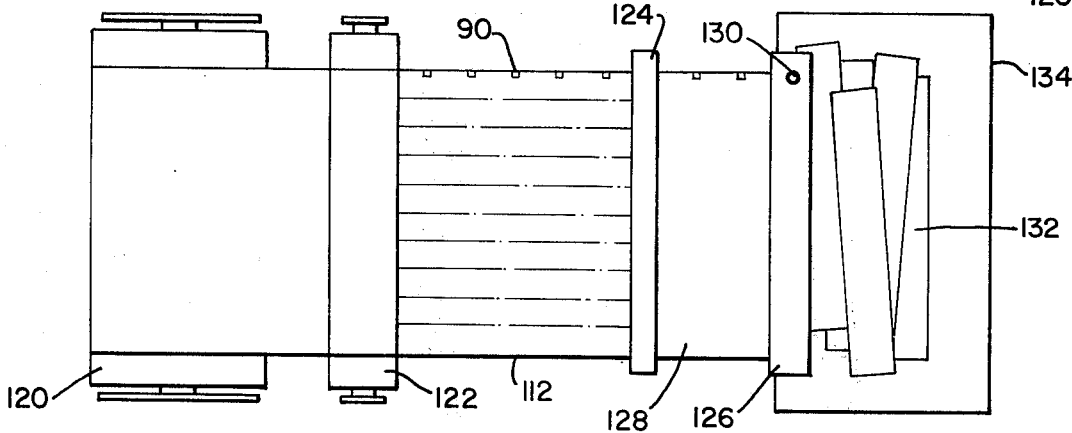
FIG_9B
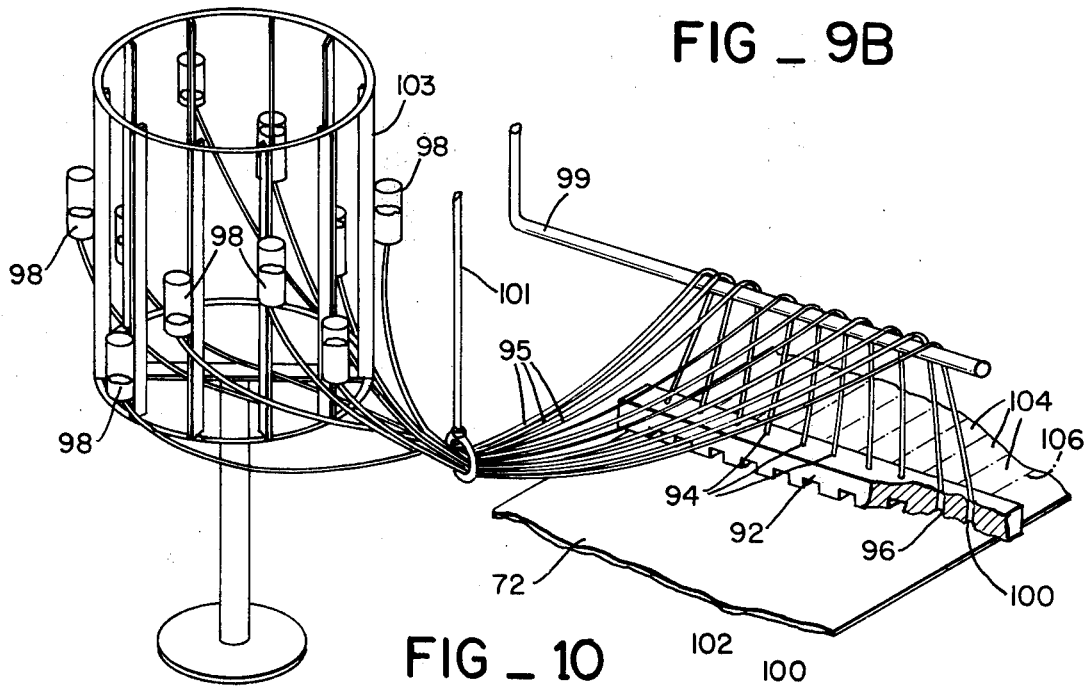
FIG_10

DIGITAL THERMOMETER AND METHOD OF MANUFACTURE

CROSS REFERENCE TO RELATED APPLICATION

This is a division of application Ser. No. 351,220, now U.S. Pat. No. 3,861,213, filed Apr. 16, 1973, which is a continuation-in-part of Ser. No. 263,064, now abandoned, filed June 15, 1972.

BACKGROUND OF THE INVENTION

1. Field of the Invention

Flexible and inflexible non-breakable thermometers are applicable to a wide variety of uses. The digital thermometer which allows for rapid reading of the temperature of its environment can be used in environments where it would be subject to abuse, without fear of contamination of the environment by mercury or the presence of glass fragments. In addition, there are many situations where a thermometer is desirable which is compact, easily mounted, safe or ornamental.

Compositions are available which respond to a particular temperature by undergoing a color change. The availability of these compositions allows for flexibility in fabricating temperature sensing devices.

2. Description of the Prior Art

U.S. patents of interest include U.S. Pat. Nos. 3,440,882; 3,585,381; 3,617,374; 3,619,254; 3,633,425; 3,667,039; 3,697,297; and 3,704,625. Also of interest is the British analog of U.S. Pat. No. 3,697,297, British Pat. No. 1,138,590. Temperature responsive liquid crystals are commercially available from Liquid Crystal Industries, Turtle Creek, Pennsylvania and Hoffman-LaRoche, Nutley, N.J.

SUMMARY OF THE INVENTION

Non-breakable digital thermometers are provided by a substantially continuous method of manufacture. A continuous sheet of an inert transparent base film is moved past a printer, which masks the film leaving evenly laterally spaced indicia as transparent areas. The masked area of the film then continues past a liquid crystal composition applicator. Individual continuous liquid crystal composition streams are coated over the indicia and rapidly partially dried, normally allowing the streams to spread sufficiently to intermingle at their edges and provide a coating of the liquid crystal composition of substantially uniform thickness. The liquid crystal composition layer is then substantially completely dried, coated with a darkly pigmented backing, may then be further processed, and finally strips cut transversely to provide individual non-breakable digital thermometers.

The liquid crystal compositions employed have temperature response ranges related to the numerical value of the indicia displayed by the composition. Adjacent compositions have overlapping temperature response ranges, so as to insure that at least one numerical indicia is visible when the temperature being measured is within the thermometer range. The thermometers can be provided in the form of tapes, which are affixed to a temperature responsive support or a stand for use on desks, for hanging, for adherence to pipes for chemical process control, and the like.

BRIEF DESCRIPTION OF THE DRAWINGS

FIG. 1 is a perspective view of a desk thermometer of this invention;

FIG. 2 is a cross-sectional view of the desk thermometer of FIG. 1;

FIG. 3 is an enlarged view of a cross section of a digital thermometer tape;

FIG. 4 is a plan view of a fragment of a digital thermometer tape;

FIG. 5 is a portion of a sheet which is masked for coating with liquid crystal compositions to produce a plurality of digital thermometers;

FIG. 6 is an alternate embodiment of a digital thermometer varying the arrangement of the numbers;

FIG. 7 is a side view of a digital thermometer employed with a polarizer for enhancing the display characteristics of the digital thermometer;

FIG. 8 is a plan view of an alternate embodiment of a digital thermometer tape;

FIGS. 9A and 9B are diagrammatic plan views of the apparatus for the process for preparing the digital thermometers; and FIG. 10 is a perspective view of a continuous liquid crystal composition applicator which is partially broken away.

DESCRIPTION OF THE SPECIFIC EMBODIMENTS

Non-breakable digital thermometers are provided employing a plurality of microencapsulated liquid crystal compositions which are displayed as numerical indicia at a common surface. The numerical value of the indicia is related to the temperature response range of the liquid crystal composition. The range for each of the compositions overlaps the range of the adjacent liquid crystal compositions, the amount of overlap varying with the differences in numerical value. In most instances, the temperature response range of any one composition will not overlap the numerical values of other than the immediately higher numerical value. In a few instances, the arrangement of numerical representations will be such, that a single composition will overlap a plurality of successive numerical values.

Various arrangements of numerical indicia are possible, so as to provide relatively broad and narrow temperature ranges. The arrangements of the numbers can also be provided in various ornamental manners, linearly, circularly, and the like.

The digital thermometers can be prepared as tapes. The backings of the tapes can be varied widely, including rigid backings, backings with adhering coatings, backings with flexible non-adhering coatings, metal foil backings to provide for rapid temperature response, and the like. Also, the tapes may be encapsulated in plastic so as to protect the digital thermometer from abrasion or contact with corrosive materials.

The digital thermometer tapes can be mass produced efficiently and economically. A large flat or planar sheet of a durable clear plastic can be masked so as to leave clear areas in the shape of numerical indicia. The masking need only provide dark borders delineating a particular representation or symbol. Portions of the area between symbols could be left transparent.

The masking can be carried out serially or continuously, so as to print a large number of thermometers simultaneously or sequentially. Each of the clear areas or windows may then be coated individually with a slurry of a microencapsulated liquid crystal composition having the appropriate thermal response range in relation to the numerical value displayed, so as to undergo its transitions above, at, or below the numerical value. The liquid crystal compositions may then be coated with a dark backing, for example a black paint and additional backings provided as desired.

To enhance the appearance of the thermometer, the digital thermometer may be combined with two polaroid sheets at right angles to each other, with the digital thermometer as the hypotenuse of a right triangle. By providing for a cool light source or insulated light source to transmit light through one of the polarizing sheets, the display characteristics of the digital thermometer can be greatly enhanced.

By varying the type of liquid crystal composition, the digital thermometers can be varied as to their use. Irreversible temperature responsive liquid crystals can be employed, so that once the transition has occurred, the liquid crystals do not revert to their original state. An alternative composition is one which fades only extremely slowly, so that peak temperatures are registered and retained for reasonably long periods of time, for example a day or two. These can be used by themselves, or in combination with the rapidly reversible thermally responsive liquid crystals, so that one can see the present temperature and the highest temperature which has occurred within a previous fixed period.

For further understanding of the invention, the drawings will now be considered. In FIG. 1 is a model of a desk digital thermometer 10. A digital thermometer tape 12 is adhered to a flat bottom surface 14 which is at the bottom of a well 16. The digital thermometer stand 20 has quadrilateral sides 22 and a front wall 24 of smaller dimension than the rear wall 26, so that the digital thermometer tape 12 is at a convenient angle to the viewer. The top edge 18 of the sides 22 is inclined downward toward the front wall 24 of the stand 20.

The bottom surface 14 is of a thin-walled construction, so as to rapidly transmit temperature changes to the tape 12. The air captured in the cavity 30 serves as an air well to interact with the surrounding atmosphere and respond to variations in temperature, without responding to sudden gradients or currents.

Various materials may be employed in fabricating the stand 20, such as plastics, metals such as aluminum, steel, etc., and vitreous materials.

In FIG. 1, the temperature is indicated by the numerals seventy-three 32. On the tape 16 in FIG. 1, the temperatures are indicated by alternating odd numbers. The liquid crystal composition employed for each temperature will have a thermal response range overlapping at least one adjacent temperature, usually the next higher adjacent temperature.

To some degree the choice of the range of overlap as to the extent and temperature range is arbitrary. Usually, the overlap will be about 10 to 50%, more usually 20 to 30%, of the difference between the two values. That is, for a 1° difference the extent of overlap will be from about 0.1° to about 0.5°. As a practical matter, it is found that with differences of value between 1° and 2°, an overlap of about 0.2° to 0.6° is preferred.

The particular temperature range of overlap may be intermediate the two temperatures, or may overlap the numerical value displayed. For example, with adjacent values of 71° and 73°, the temperature responsive range for the liquid crystal composition for 71° would include 73°. In a preferred embodiment the temperature responsive range for 71° would have transition temperatures slightly below 71° and slightly greater than 73°.

The three temperatures 69°, 71° and 73° will be used as exemplary, with 71° being the numerical value displayed. Normally, the initial or lower transition temperature will be less than the numerical value displayed (71°) by about 5 to 30%, preferably 15 to 25%, of the difference between the numerical values displayed and the next lower numerical value (69°). That is, the transition temperature would be between 70.4° and 70.9°. The final or higher transition temperature will be greater than the next higher numerical value (73°) by about 5 to 30%, preferably 15 to 25%, of the difference between the numerical value displayed (71°) and the next higher numerical value (73°). The transition temperature would be in the range of 73.1° to 73.6°.

In FIG. 4, the numerals 73 32 and 71 34 are indicated, with 73 having undergone a transition, and 71 34 fairly dark. Normally close to the low transition the liquid crystals are transparent, then red to tan, turning to green, then blue and then transparent or black. The microencapsulated liquid crystals may be tinted so as to vary the shade. Therefore, a greater variety of colors can be obtained than those naturally related to the cholesteryl liquid crystals.

In describing the method of manufacture of a digital thermometer tape, FIG. 3 will be considered. FIG. 3 is a cross section of the tape 16 having a transparent thin film surface 36. Conveniently, ethylene polyterephthalate (Mylar) may be employed as the film. The film will normally be at least about 1 mil thickness and usually not exceed 20 mils thickness, depending on the nature of the digital thermometer and its use. The film is shown in FIG. 5 as a sheet 40 which may be used to prepare a plurality of tapes as digital thermometers. A darkly pigmented mask 42 is printed on the sheet 40 either sequentially or as a block print leaving transparent areas 44 in the shape of the numerical indicia for the particular temperature. Various blocks, rollers or the like can be used to provide the darkened areas. Conveniently, printers ink may be employed, which is black, stable, and does not detrimentally interact with the liquid crystal compositions. Alternatively, the transparent areas could be defined by relatively narrow dark borders.

Characters or symbols other than numerals can be delineated. Letters, designs, phrases, and the like may be characterized by a dark border or mask on the transparent film, where the character or symbol is related to the temperature response range of the liquid crystal composition. For example, a warning phrase could be delineated, so that the liquid crystal composition would spell out a warning that an area was hot.

For each numerical index or symbol, a particular temperature responsive liquid crystal composition is employed. The liquid crystal compositions are provided as microencapsulated capsules having sizes in the range of 1 microns to about 5 thousand microns as the average dimension, more usually from about 10 to 50 microns. The microencapsulated liquid crystal compositions are found to be essential to the successful operation of the subject invention. A description of the method of preparation of the microencapsulated temperature responsive liquid crystals may be found in British Pat. No. 1,138,590.

An illustrative method for making microencapsulated temperature responsive liquid crystals is as follows: acid extracted pigskin gelatin (1.25 g), having a bloom strength of 250–305 g and an isoelectric point of pH 8–9, and 1.25 g of gum arabic, are stirred with 125 g of distilled water at 55° C. in a Waring blender to yield a solution of about pH 4.5. The pH was initially adjusted to 6.0 when the solution was formed by the dropwise addition of 20 weight percent aqueous sodium hydroxide. To the above solution is added a solution of 2 g of cholesteryl propionate in 8 g of cholesteryl oleate. The cholesteryl derivative materials are emulsified in the Waring blender vessel to an average droplet size of 10–50μ and the pH slowly reduced by the dropwise addition of 14 weight percent aqueous acetic acid. The addition of the acid is continued until the single, liquid walled, capsules cluster to form aggregates having diameters at about 25–100μ. At this time, the pH is about five.

The mixture is then chilled with an ice bath to below 10° C., while the agitation is continued. At 10° C., 0.6 ml of a 25 weight percent aqueous solution of pentanedial, is added to the blender vessel and the system stirred for about 12 hours while slowly allowing the mixture to warm to room temperature. At the end of that time, the capsule walls are firm and hardened and the mixture is poured through a wire mesh sieve having openings of 74μ. That which passes the screen is suitable for coating.

The transparent areas of numerical indicia on the film are then coated with a slurry of the type prepared above. A draw down applicator may be used to provide a wet thickness of from about 2 to 10 mils. The slurry is then allowed to dry under ambient conditions, severe drying conditions being avoided.

Depending on the desired temperature, various cholesteryl esters may be employed as mixtures to provide the desired temperature range. The particular compositions employed are well known in the art and the manner in which they can be prepared may be found in a number of texts such as G. H. Brown, Liquid Crystals, Volume 2, parts 1 and 2, 1969; G. H. Brown, et al., Chem., Rev. 57 1049 (1957); and Asaup, Agnew, Chem. 7, 97 int. ed. (1968). For liquid crystal compositions other than cholesteryl esters, see U.S. Pat. No. 3,619,254.

Various methods of applying the liquid crystal slurry may be employed. The composition may be printed directly over the numbers, may be brushed on so as to extend past the clear areas and onto the mask, or may be rolled on so that there is some contact between the liquid crystal compositions at their edges to form a relatively continuous layer 46. The particular manner in which the liquid crystal slurry compositions are applied can be varied and different methods can be employed, depending on the available equipment, the size of the digital thermometer, and the desired or required degree of efficiency.

After the liquid crystal slurry compositions have been allowed to dry to a thin substantially continuous film, they may be coated or covered with a wide variety of dark backgrounds to provide a dark layer backing 48. Most conveniently, a black ink or paint may be employed, such as oil base, or oil-in-water emulsion paints, which are reasonably rapidly drying, and do not affect the properties of the liquid crystals. Various other dark pigmentations may be employed besides black, as desired. The paint provides a protective cover as well as the dark background.

Since the paint will provide only relatively fragile protection, additional coatings will usually be provided. Depending on the ultimate use of the digital thermometer tape, which has been prepared, various coatings may be applied. Most conveniently, an adhesive coating may be applied with a removable protective sheet. Any adhesive may be used, such as rubber based adhesives, polyvinyl alcohol type adhesives, and the like, which either provide a strippable bond or a secure bond to a surface, once the adhesive has been applied to the surface. Desirably, metal foil, e.g. aluminum foil, can be used as a backing. Alternatively, the digital thermometer may be mounted on a rigid backing 49, or on the stand 20 as depicted in FIG. 1. Where it is desirable to use it in a swimming pool or other corrosive or hydrolytic environment, such as a sauna, hot house and the like, the tape may be encapsulated in a thin plastic shield so as to provide a rigid protected thermometer.

As is depicted in FIGS. 1 and 4, alternating numbers are employed for the digital thermometer. However, the numbers need not be alternating, but can be successive and variations on these forms may be employed. For example, for a household thermometer, where the primary interest may be in the range of 65° to 75° F., one could have successive numbers in that range, with alternating numbers outside of that range or even greater differences between the numerical values of adjacent numbers.

An alternate embodiment of a series of numerical indicia is to have one large number for each ten degree range and a series of small numbers, where the large number has a liquid crystal composition having a temperature response for at least the ten degrees involved and preferably overlapping to a minor extent, at least a quarter of a degree and preferably at least about a half of a degree Fahrenheit with the adjacent large integers. The intermediate numbers which are shown as smaller, as depicted in FIG. 6, would have liquid crystal compositions for their particular temperatures, and a temperature response range which would overlap with the adjacent integers as previously indicated, namely by about one and one-quarter times the difference between adjacent integers. As already indicated, any ornamental design can be employed which is attractive, and imparts the necessary temperature information. Therefore, thermometers can be designed which have spiral configurations, circular configurations, planar configurations, and the like.

The light which is reflected from the liquid crystals is circularly polarized. In FIG. 7 is an embodiment which utilizes this effect to enhance the attractiveness of the digital thermometer and enhanced visualization. A polarized sheet 50 is employed to polarize the light emanating from light source 52 which strikes the digital thermometer 54. The polarized light is only reflected from the liquid crystals which are colored at the specific temperature and exits through analyzer 56, a second polarized sheet. Only the light reflecting from the particular numbers will be seen; the scattered light which is not circularly polarized will not pass through the analyzer. Sheets 50 and 56 are at right angles to each other, with digital thermometer 54 providing the hypotenuse of a triangle.

The thermometers need not be limited to Fahrenheit temperatures, but can also be employed with Centigrade temperatures. A Centigrade thermometer is depicted in FIG. 8. The same notions of overlap for the temperature ranges of the liquid crystal compositions apply for Centigrade as apply for Fahrenheit. In FIG. 8, the thermometer 58 has the numbers 60 in numerical sequence. In additiono to the numbers, arrows 62 and 64 appear at each end of the thermometer 58. The numbers 60 depicted in the thermometer are considered to be the comfort range, those temperatures which are most likely to be encountered in a home or office.

In the event that the temperature dips below 19° C., the arrow 62 has a wide temperature range liquid crystal composition which will remain visual to temperatures substantially below 19° C., for example until 10° C. Therefore, the arrow would indicate that the thermometer 58 is operative, but that the ambient temperature is below the range of the numerical indicia. Similarly, the arrow 64 adjacent the numeral 30 would have a wide temperature range liquid crystal composition which would remain visual over a relatively broad temperature range above 30° C., for example, to 40° C. In this manner, despite the temperature being outside the temperature range indicated by the numerals, and therefore outside the range of the liquid crystal compositions employed for the numerals, there is still an indication on the thermometer that the temperature is either above or below the numbers indicated, and that the thermometer in operative. Of course, other information imparting symbols could be employed with the digital thermometer in the above scheme, where the liquid crystals are used to impart a message which is relevant to the ambient temperature.

A rapid, efficient and ecnomical method for commercial production of flexible strips of non-breakable thermometers is depicted from FIGS. 9A and 9B. A roll 70 is provided of a thin transparent film 72, usually of about 4–5 mils thickness and conveniently of Mylar or other suitable plastic. The roll 70 is mounted on the stand 74, which provides some drag as it feeds the film 72. The film 72 passes under printing roll 76 which has recessed numerals 80. An inking roll 82 maintains a continuous coating of a darkly pigmented ink on the printing roll 76. An index marker 84 is also recessed on the roll; its function will be discussed subsequently. As the film 72 passes the printing roller 76, the film is coated with a heavy dark mask 78 which leaves the numerals 86 and the index 90 transparent. Therefore, the film 72 is substantially completely blackened except for the transparent areas of indicia 86 and the index 90.

The film is then coated with liquid crystal compositions by the coating device 92, depicted in FIG. 10. The coating device has a plurality of inlets 94, a different liquid crystal composition being fed to each of the inlets 94 through conduits 95 from reservoirs 98. The conduits are supported by support rod 99 and eye bolt 101. It is found, that the slurries of liquid crystal compositions will vary in viscosity with time. The viscosities are found to be in the range of about 900 to 2,000 centipoise at ambient temperatures.

Either manual or mechanical means can be employed to insure a constant rate of feed of the liquid crystal composition slurry onto the film 72. Reservoirs 98 mounted on support stand 103 can be automatically or manually moved, so as to change the height of the fluid head and therefore maintain a constant flow. Metering pumps can be employed, so as to insure a constant rate of flow, irrespective of the viscosity of the fluid.

The slurry composition usually includes water, polyvinyl alcohol thickener, a binder and the microencapsulated liquid crystal composition.

The inlet feeder is expanded at its exit 96, so that the liquid crystal composition flows over a substantial portion of the cross section to be covered by the liquid crystal composition. Sufficient liquid crystal composition is flowed onto the flim 72 to provide a final height or thickness of the coating of about 4–6 mils. Tunnel openings 100 are provided having a height of about 12–15 mils.

While the indicia can be of any dimension, the two indicia relating to a specific numerical value will generally have a cross center of about ¼ to ¾ of an inch, more usually about ½ inch in the direction normal to the direction of travel of the transparent film 72. The width of the tunnel may be the same as the cross-sectional area of the numerals, slightly smaller or slightly greater, usually not differing by more than about 1/16 of an inch. The dividers 102 between the tunnel openings 100 serve to initially maintain a space between each band or stripe 104 of liquid crystal composition coating to provide discrete stripes. As the film 72 emerges from the coating device 92, the stripes 104 of coating begin to flow toward each other so as to commingle at the edges 106. The width of the terminal stripe 105 adjacent the index 90 is controlled, so as not to cover the index 90 and thus leave a transparent area. The stripe is formed at a sufficient distance from the index, so that the broadening of the band does not coat the index.

Radiant heating lamps 110 are provided adjacent the coating device 92 as the film emerges from the coating device. The temperature at the surface should not exceed 190° F. and will usually be in excess of 150° F. The heat from the radiant lamp is sufficient to rapidly harden the surface of the liquid crystal composition coating 104 and prevent excessive commingling of the liquid crystal compositions. Therefore, except for the borders 106 of the stripes 104, the liquid crystal compositions retain their individual integrity. In this manner, a coating of substantially uniform thickness is achieved, which provides dimensional stability for the thermometer strips.

While the thin film of the liquid crystal composition at the surface is dry, a substantial proportion of the liquid crystal composition must be dried further. Various techniques may be employed to achieve this, such as drying ovens, warm air dryers, vacuum systems, and the like. Conveniently for present purposes, the coated film 112 is taken up on take-up roller 114 concurrently with adsorbent paper toweling 118 which is fed from roll 116 so that the adsorbent paper toweling 118 is intermediate the coated film 112. Depending on the conditions under which the resulting fluffy roll 120 is maintained, the period of drying may require from 6 to 48 hours.

After a sufficient time to achieve the requisite drying, the adsorbent paper toweling 118 in fluffy roll 120 is taken up on paper take-up roll 122, while the coated film 112, now dried, is moved past the dark pigment coating roller 124 which coats the coated film 112 with a dark backing. The dark backing provides a uniform dark field behind the visual numerical indicia. The coated film 112 then continues to cutter 126 which is equipped with photocell 130. The photocell is activated when the index mark 90 is in position, and activates the cutter 126. The cutter 126 cuts the film transverse to the direction of travel of the coated film 112 and provides strip 132 of substantially uniform width.

It is found in practice, that small deviations will occur in the regularity of the printing and the spacing of the numerals in the direction of travel. Since these errors can be additive, a cutter which would be based on a fixed distance would soon be cutting into the numerical indicia. By providing index markers associated with a particular set of numerals, the cutter cuts on a line which provides a satisfactory border for the numerals for each thermometer. The strips 132 which form when the coated layer is cut fall into a bin 134 and are collected.

Depending on the use of the strips, various other processing can be carried out prior to cutting. For example, an adhesive layer may be spread over the dark backing and then covered with a protective film. Alternatively, a layer of aluminum foil may be applied to the dark backing, to provide a more sensitive temperature response.

The subject invention provides a number of advantages. Convenient thermometers can be provided which are unbreakable and can be used as alternatives to mercury thermometers, in environments where mercury or glass are hazards. The thermometers can be made of any convenient size inexpensively, so as to be visual at great distances. In addition, by using liquid crystal compositions having overlapping temperature ranges, at all times in the range covered at least one number is observable, and usually a second number is observable, so as to indicate more accurately the approximate temperature. In addition, thermometers can be provided as tapes, having adhering backings, so that they may be applied to any surface, for ornamental purposes, for registering the temperature of the surface, and the like. The thermometers of this invention can be efficiently and economically manufactured by mass production means, so as to provide inexpensive, relatively accurate and attractive digital thermometers.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A digital thermometer readable by comparing the intensity of the visibility of adjacent digits comprising: a support having a plurality of transparent areas in the form of digital representations, delineated by opaque borders in a predetermined order of increasing value; a plurality of different microencapsulated temperature responsive liquid crystal compositions having different temperature response ranges, wherein each of said transparent areas has a substantially uniform coating of a thickness about the same as its adjacent transparent areas of a liquid crystal composition having a lower transition temperature below the numerical value represented by its digital representation and having an upper transition temperature above the numerical value represented by its digital representation and overlapping the temperature response range of the liquid crystal composition coated onto the transparent area of the digital representation of the next succeeding numerical value, the amount of overlap between adjacent digital representations being sufficiently consistent and of a magnitude so that the relative intensity of adjacent digits can be compared to estimate temperature.

2. A digital thermometer in accordance with claim 1 wherein the amount of said overlap is about 10 to 50 percent of the difference in the values of adjacent digits.

3. A digital thermometer in accordance with claim 1 wherein the amount of said overlap is about 20 to 30 percent of the difference in the values of adjacent digits.

4. A digital thermometer in accordance with claim 1 wherein said support is a flexible plastic strip.

5. A digital thermometer in accordance with claim 1 wherein the thickness of the liquid crystal coating on each said transparent areas is about 4–6 mils.

6. A digital thermometer readable by comparing the intensity of the visibility of the adjacent digits comprising: a flat support having a plurality of digital representations lineally disposed in a predetermined order of increasing value, said digits being delineated by transparent areas and cooperating opaque areas; a plurality of different microencapsulated liquid crystal compositions having different temperature response ranges substantially uniformly coated in substantially parallel bands over the combination of said transparent areas and cooperating opaque areas, said bands having a preselected approximately equal thickness, each of said coated liquid crystal compositions having a lower transition temperature below the numerical value represented by its digital representation and having an upper transition temperature above the numerical value represented by its digital representation, each coated liquid crystal composition having a temperature resonse range overlapping the temperature response range of the liquid crystal composition coated onto the transparent area of the next succeeding numerical value, the amount of overlap between adjacent digital representations being sufficiently consistent and of a magnitude so that the relative intensity of adjacent digits can be compared to estimate temperature, and stand means for disposing said support for viewing in a position adapted to render said coated liquid crystal compositions responsive to variation in the temperature of the surrounding atmosphere.

7. A digital thermometer in accordance with claim 6 wherein said stand means comprises a thin, longitudinal, thermally conductive flat surface, said support being mounted on said flat surface.

8. A digital thermometer in accordance with claim 7 wherein said stand means comprises a housing including said flat surface and enclosing a cavity.

9. A digital thermometer in accordance with claim 8 wherein said flat surface is recessed in a well in said housing.

10. A digital thermometer readable by comparing the intensity of the visibility of adjacent digits comprising: a support having a plurality of transparent areas in the form of digital represnntations, delineated by opaque borders in a predetermined order of increasing value; a plurality of different microencapsulated temperature responsive liquid crystal compositions having different temperature response ranges, wherein each of said transparent areas has a substantially uniform coating of a thickness about the same as its adjacent transparent areas of a liquid crystal composition having a lower transition temperature below the numerical value represented by its digital representation and having an upper transition temperature above the numerical value represented by its digital representation and overlapping the temperature response range of the liquid crystal composition coated onto the transparent area of the digital representation of the next succeeding numerical value, the amount of overlap between adjacent digital representations being sufficiently consistent and of a magnitude so that the relative intensity of adjacent digits can be compared to estimate temperature, and stand means for disposing said support in position for viewing and adapted to render said coated liquid crystal compositions responsive to variations in the temperature of the surrounding atmosphere.

11. A digital thermometer in accordance with claim 10 wherein said stand means comprises a thin, longitudinal, thermally conductive flat surface, said support being mounted on said flat surface.

12. A digital thermometer in accordance with claim 11 wherein said stand means comprises a housing including said flat surface and enclosing a cavity.

13. A digital thermometer in accordance with claim 12 wherein said flat surface is recessed in a well in said housing.

* * * * *